(12) United States Patent
Flagg et al.

(10) Patent No.: US 12,073,646 B2
(45) Date of Patent: Aug. 27, 2024

(54) DOCUMENT SEARCH FOR DOCUMENT RETRIEVAL USING 3D MODEL

(71) Applicant: Georgetown University, Washington, DC (US)

(72) Inventors: Cristopher Flagg, Annandale, VA (US); Ophir Frieder, Chevy Chase, MD (US)

(73) Assignee: Georgetown University, Washington, DC (US)

( * ) Notice: Subject to any disclaimer, the term of this patent is extended or adjusted under 35 U.S.C. 154(b) by 46 days.

(21) Appl. No.: 17/716,859

(22) Filed: Apr. 8, 2022

(65) Prior Publication Data

US 2022/0327851 A1 Oct. 13, 2022

Related U.S. Application Data

(60) Provisional application No. 63/173,018, filed on Apr. 9, 2021.

(51) Int. Cl.
*G06V 30/418* (2022.01)
*G06F 16/55* (2019.01)
(Continued)

(52) U.S. Cl.
CPC ............ *G06V 30/418* (2022.01); *G06F 16/55* (2019.01); *G06F 16/56* (2019.01); *G06T 17/00* (2013.01);
(Continued)

(58) Field of Classification Search
CPC ............ G06N 3/049; G06N 3/02; G06N 3/08; G06N 20/00; G06N 3/088; G06N 5/022; G06T 2207/20084; G06T 2207/20081
See application file for complete search history.

(56) References Cited

U.S. PATENT DOCUMENTS

D63,657 S 12/1923 Root
9,424,461 B1 * 8/2016 Yuan ..................... G06V 20/647
(Continued)

FOREIGN PATENT DOCUMENTS

WO WO-2021146700 A1 * 7/2021 ........... G06K 9/0063

OTHER PUBLICATIONS

Flagg and Frieder, "Direct Sampling of Multiview Line Drawings for Document Retrieval," DocEng '20, Sep. 29-Oct. 2, 2020, Virtual Event, CA, USA, 10 pages.
(Continued)

*Primary Examiner* — Charles Tseng
(74) *Attorney, Agent, or Firm* — Klarquist Sparkman, LLP

(57) ABSTRACT

Technologies are described for reconstructing physical objects which are preserved or represented in pictorial records. The reconstructed models can be three-dimensional (3D) point clouds and can be compared to existing physical models and/or other reconstructed models based on physical geometry. The 3D point cloud models can be encoded into one or more latent space feature vector representations which can allow both local and global geometric properties of the object to be described. The one or more feature vector representations of the object can be used individually or in combination with other descriptors for retrieval and classification tasks. Neural networks can be used in the encoding of the one or more feature vector representations.

12 Claims, 17 Drawing Sheets

(51) Int. Cl.
  *G06F 16/56* (2019.01)
  *G06T 17/00* (2006.01)
  *G06V 10/764* (2022.01)
  *G06V 10/82* (2022.01)
  *G06V 40/16* (2022.01)

(52) U.S. Cl.
  CPC ............ *G06V 10/764* (2022.01); *G06V 10/82* (2022.01); *G06V 40/169* (2022.01); *G06T 2200/04* (2013.01); *G06T 2200/08* (2013.01)

(56) References Cited

U.S. PATENT DOCUMENTS

2019/0270015 A1* 9/2019 Li ........................... G06T 19/00
2020/0334555 A1* 10/2020 Liu ........................ G06N 5/046
2022/0327851 A1* 10/2022 Flagg ................... G06V 20/653

OTHER PUBLICATIONS

Naeem Bhatti and Allan Hanbury. 2013. Image search in patents: a review. International journal on document analysis and recognition 16, 4 (2013), 309-329.
Naeem Bhatti, Allan Hanbury, and Julian Stottinger. 2018. Contextual local primitives for binary patent image retrieval. Multimedia Tools and Applications 77, 7 (2018), 9111-9151.
Blender Online Community, Blender—a 3D modelling and rendering package. Blender Foundation, Blender Institute, Amsterdam. http://www.blender.org, 14 pages, 2020.
Angel X. Chang, Thomas Funkhouser, Leonidas Guibas, Pat Hanrahan, Qixing Huang, Zimo Li, Silvio Savarese, Manolis Savva, Shuran Song, Hao Su, Jianxiong Xiao, Li Yi, and Fisher Yu. 2015. "ShapeNet: an Information-Rich 3D Model Repository," Technical Report arXiv:1512.03012 [cs.GR]. Stanford University—Princeton University—Toyota Technological Institute at Chicago, http://www.shapenet.org, 11 pages.
Gabriela Csurka, "Document image classification, with a specific view on applications of patent images," In Current Challenges in Patent Information Retrieval. Springer, pp. 325-350, 2017.
Gabriela Csurka, Jean-Michel Renders, and Guillaume Jacquet. 2011. XRCE's Participation at Patent Image Classification and Image-based Patent Retrieval Tasks of the Clef-IP 2011. In CLEF (Notebook Papers/Labs/Workshop), vol. 2, 7 pages, 2011.
Bei Fang, Ying Li, Haokui Zhang, and Jonathan Cheung-Wai Chan, "Semisupervised deep learning classification for hyperspectral image based on dualstrategy sample selection," Remote Sensing 10, 574, 23 pages, 2018.
Matthias Fey and Jan E. Lenssen, "Fast Graph Representation Learning with PyTorch Geometric," In ICLR Workshop on Representation Learning on Graphs and Manifolds, 9 pages, 2019.
Cristopher Flagg and Ophir Frieder, "Searching Document Repositories using 3D Model Reconstruction," In Proceedings of the ACM Symposium on Document Engineering, 10 pages, 2019.
Kaiming He, Xiangyu Zhang, Shaoqing Ren, and Jian Sun, "Deep residual learning for image recognition," In Proceedings of the IEEE Conference on Computer Vision and Pattern Recognition, pp. 770-778, 2016.
Masanori Idesawa, "A system to generate a solid figure from three view," Bulletin of JSME 16, 92 (1973), 216-225, 1973.
Alex Krizhevsky, Ilya Sutskever, and Geoffrey E Hinton, "Imagenet classification with deep convolutional neural networks," In Advances in Neural Information Processing Systems, 9 pages, 2012.
Aldo Laurentini, "The visual hull concept for silhouette-based image understanding," IEEE Transactions on Pattern Analysis and Machine Intelligence, vol. 16(2), pp. 150-162, Feb. 1994.
Chu-Hui Lee and Liang-Hsiu Lai, "Retrieval of 3D Trademark Based on Discrete Fourier Transform," In International Conference on Mobile and Wireless Technology, Springer, 10 pages, 2017.
Yangyan Li, Rui Bu, Mingchao Sun, Wei Wu, Xinhan Di, and Baoquan Chen, "Pointcnn: Convolution on x-transformed points," In Advances in Neural Information Processing Systems, 11 pages, 2018.
Wojciech Matusik, Chris Buehler, Ramesh Raskar, Steven J Gortler, and Leonard McMillan, "Image-based visual hulls," In Proceedings of the 27th Annual Conference on Computer Graphics and Interactive Techniques, pp. 369-374, 2000.
Charles R Qi, Hao Su, Kaichun Mo, and Leonidas J Guibas, "Pointnet: Deep learning on point sets for 3d classification and segmentation," In Proceedings of the IEEE Conference on Computer Vision and Pattern Recognition, pp. 652-660, 2017.
Charles Ruizhongtai Qi, Li Yi, Hao Su, and Leonidas J Guibas, "Pointnet++: Deep hierarchical feature learning on point sets in a metric space," In Advances in Neural Information Processing Systems, 14 pages, 2017.
Simon SP Shum, WS Lau, Matthew Ming-Fai Yuen, and Kai-Ming Yu, "Solid reconstruction from orthographic views using 2-stage extrusion," Computer-Aided Design 33 (2001), pp. 91-102.
Karen Simonyan and Andrew Zisserman, Very Deep Convolutional Networks for Large-Scale Image Recognition, arXiv:cs.CV/1409.1556, 14 pages, 2014.
Gege Song, Xianglin Huang, Gang Cao, Wei Liu, Jianglong Zhang, and Lifang Yang, "Enhanced deep feature representation for patent image classification," In Tenth International Conference on Graphics and Image Processing (ICGIP 2018), vol. 11069. International Society for Optics and Photonics, 110690P, 11 pages, May 6, 2019.
Hang Su, Subhransu Maji, Evangelos Kalogerakis, and Erik Learned-Miller, "Multi-view convolutional neural networks for 3d shape recognition," In Proceedings of the IEEE International Conference on Computer Vision, pp. 945-953. http://vis-www.cs.umass.edu/mvcnn/, code: https://github.com/jongchyisu/mvcnn_pytorch, 2015.
Christian Szegedy, Vincent Vanhoucke, Sergey Ioffe, Jonathon Shlens, and Zbigniew Wojna, "Rethinking the Inception Architecture for Computer Vision," arXiv:cs.CV/1512.00567, pp. 2818-2826, 2015.
Stefanos Vrochidis, Symeon Papadopoulos, Anastasia Moumtzidou, Panagiotis Sidiropoulos, Emanuelle Pianta, and Ioannis Kompatsiaris, "Towards content-based patent image retrieval: a framework perspective," World Patent Information 32 (2010), pp. 94-106.
Liping Yang, Ming Gong, and Vijayan K Asari, "Diagram Image Retrieval and Analysis: Challenges and Opportunities," In Proceedings of the IEEE/CVF Conference on Computer Vision and Pattern Recognition Workshops, pp. 180-181, 2020.
Zhiyuan Zeng and Wenli Yang, "Design Patent Image Retrieval Based on Shape and Color Features," JSW 7, 6, pp. 1179-1186, 2012.
Lei Zhu, Hai Jin, Ran Zheng, Qin Zhang, Xia Xie, and Mingrui Guo, "Contentbased design patent image retrieval using structured features and multiple feature fusion," In Image and Graphics (ICIG), 2011 Sixth International Conference on IEEE, pp. 969-974, 2011.
Design Patent Application Guide, https://www.uspto.gov/patents-getting-started/patent-basics/types-patent-applications/design-patent-application-guide, 57 pages, Feb. 3, 2019.
Seven Step Strategy, https://www.uspto.gov/sites/default/files/documents/7%20Step%20US%20Patent%20Search%20Strategy%20Guide%20%282016%29%20Long%20Version.pdf, 7 pages, Jun. 29, 2017.
WIPO Launches Unique Image-Based Search for Trademarks, Other Brand Information. https://www.wipo.int/pressroom/en/articles/2014/article_0007.html. WIPO Media Center, Geneva, 2 pages, May 2014.
Christian Ah-Soon and Karl Tombre, "A step towards reconstruction of 3-D CAD models from engineering drawings," In Document Analysis and Recognition, Proceedings of the Third International Conference on, vol. 1. IEEE, pp. 331-334, 1995.
Nicolas Aspert, Diego Santa-Cruz, and Touradj Ebrahimi, "Mesh: Measuring errors between surfaces using the hausdorff distance," In Proceedings IEEE International Conference on Multimedia and Expo, vol. 1. IEEE, 705-708, 2002.
Song Bai, Xiang Bai, Zhichao Zhou, Zhaoxiang Zhang, and Longin Jan Latecki, "Gift: a real-time and scalable 3d shape search engine,"

(56) References Cited

OTHER PUBLICATIONS

In Proceedings of the IEEE Conference on Computer Vision and Pattern Recognition, pp. 5023-5032, 2016.

Herbert Bay, Tinne Tuytelaars, and Luc Van Gool, "Surf: Speeded up robust features," In European conference on computer vision, Springer, pp. 404-417, 2006.

Liangliang Cao, Jianzhuang Liu, and Xiaoou Tang, "3D object reconstruction from a single 2D line drawing without hidden lines," Proceedings of the Tenth IEEE International Conference on Computer Vision (ICCV'05), vol. 1., IEEE, pp. 272-277, 2005.

Angel X. Chang, Thomas Funkhouser, Leonidas Guibas, Pat Hanrahan, Qixing Huang, Zimo Li, Silvio Savarese, Manolis Savva, Shuran Song, Hao Su Jianxiong Xiao, Li Yi, and Fisher Yu, "ShapeNet: an Information-Rich 3D Model Repository," Technical Report arXiv:1512. 03012 [cs.GR]. Stanford University—Princeton University—Toyota Technological Institute at Chicago https://shapenet.cs.stanford.edu/shree17/, 11 pages, Dec. 2015.

Adem Çiçek and Mahmut Gülesin, "Reconstruction of 3D models from 2D orthographic views using solid extrusion and revolution," Journal of Materials Processing Technology 152, 3 (2004), pp. 291-298, 2004.

Takahiko Furuya and Ryutarou Ohbuchi, "Deep Aggregation of Local 3D Geometric Features for 3D Model Retrieval," In BMVC, pp. 121.1-121.12, 2016.

Jan Knopp, Mukta Prasad, Geert Willems, Radu Timofte, and Luc Van Gool, "Hough transform and 3D Surf for robust three dimensional classification," In European Conference on Computer Vision, Springer, pp. 589-602, 2010.

Bo Li and Henry Johan, "3D model retrieval using hybrid features and class information," Multimed Tools and Applications 62, 3, pp. 821-846, 2013.

H Li, T Zhao, N Li, Q Cai, and J Du, "Feature matching of multi-view 3d models based on hash binary encoding," Neural Network World 27, 1, pp. 95-105, 2017.

David G Lowe, "Object recognition from local scale-invariant features," In ICCV, IEEE, 8 pages, Sep. 1999.

Guoping Qiu, "Indexing chromatic and achromatic patterns for content-based colour image retrieval," Pattern Recognition 35, 8, pp. 1675-1686, 2002.

Radu Bogdan Rusu, Nico Blodow, and Michael Beetz, "Fast point feature histograms (FPFH) for 3D registration," In 2009 IEEE International Conference on Robotics and Automation, IEEE, pp. 3212-3217, 2009.

Manolis Savva, Fisher Yu, Hao Su, Asako Kanezaki, Takahiko Furuya, Ryutarou Ohbuchi, Zhichao Zhou, Rui Yu, Song Bai, Xiang Bai, et al., Large-scale 3D shape retrieval from ShapeNet Core55: SHREC' 17 track, In Proceedings of the Workshop on 3D Object Retrieval, Eurographics Association, pp. 39-50, 2017.

Philip Shilane, Patrick Min, Michael Kazhdan, and Thomas Funkhouser, "The princeton shape benchmark," In Shape modeling applications, Proceedings 1141 IEEE, pp. 167-178, 2004.

Masaji Tanaka, Laurence Anthony, Toshiaki Kaneeda, and Junji Hirooka, "A single solution method for converting 2D assembly drawings to 3D part drawings," 1147 Computer-Aided Design 36, 8, pp. 723-734, 2004.

Fang Wang, Le Kang, and Yi Li, "Sketch-based 3d shape retrieval using con-volutional neural networks," In Computer Vision and Pattern Recognition (CVPR), Conference on IEEE, pp. 1875-1883, 2015.

Yu Zhong, "Intrinsic shape signatures: a shape descriptor for 3d object recog-nition," In 2009 IEEE 12th International Conference on Computer Vision Workshops, ICCV Workshops. IEEE, pp. 689-696, 2009.

The History of the Coca-Cola Contour Bottle—The Creation of a Cultural Icon. The Cocal-Cola Company, https://www.cocacolacompany.com/company/history/the-history-of-the-coca-cola-contour-bottle, 2020.

Silvia Biasotti, Andrea Cerri, Bianca Falcidieno, and Michela Spagnuolo, "3D artifacts similarity based on the concurrent evaluation of heterogeneous properties," Journal on Computing and Cultural Heritage (JOCCH), vol. 8, No. 4, pp. 1-19. https://dl.acm.org/doi/10.1145/2747882, Aug. 2015.

François Chollet et al., Keras: the Phython deep learning API, https://keras.io, 5 pages, 2015.

Luca Di Angelo, Paolo Di Stefano, Emanuele Guardiani, and Caterina Pane, "Automatic shape feature recognition for ceramic finds," Journal on Computing and Cultural Heritage (JOCCH), 13, 3, pp. 1-21, https://dl.acm.org/doi/abs/10.1145/3386730, 2020.

Robert Gregor, Danny Bauer, Ivan Sipiran, Panagiotis Perakis, and Tobias Schreck, "Automatic 3D Object Fracturing for Evaluation of Partial Retrieval and Object Restoration Tasks-Benchmark and Application to 3D Cultural Heritage Data," In 3D Object Retrieval, pp. 7-14, 2015.

Panagiotis Papadakis, Ioannis Pratikakis, Theoharis Theoharis, and Stavros Perantonis, "Panorama: a 3d shape descriptor based on panoramic views for unsupervised 3d object retrieval," International Journal of Computer Vision 89, 2-3, pp. 177-192, 2010.

Georgios Papaioannou, Tobias Schreck, Anthousis Andreadis, Pavlos Mavridis, Robert Gregor, Ivan Sipiran, and Konstantinos Vardis, "From reassembly to object completion: a complete systems pipeline," Journal on Computing and Cultural Heritage (JOCCH) vol. 10, No. 2, 22 pages, Mar. 2017.

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala, "PyTorch: an Imperative Style, High-Performance Deep Learning Library," In Advances in Neural Information Processing Systems 32, H. Wallach, H. Larochelle, A. Beygelzimer, F. d'Alché-Buc, E. Fox, and R. Garnett (Eds.). Curran Associates, Inc., pp. 8024-8035. http://papers.neurips.cc/paper/9015-pytorch-an-imperative-stylehigh-performance-deep-learning-library.pdf, 2019.

Raphael Rolin, Eduard Antaluca, Jean-Louis Batoz, Fabien Lamarque, and Mathieu Lejeune, "From Point Cloud Data to Structural Analysis Through a Geometrical hBIM-Oriented Model," Journal on Computing and Cultural Heritage (JOCCH) vol. 12, No. 2, pp. 1-26, May 2019.

Ivan Sipiran, Benjamin Bustos, and Tobias Schreck, "Data-aware 3D partitioning for generic shape retrieval," Computers & Graphics 37, 5, pp. 460-472, May 8, 2013.

Flagg and Frieder, "Reconstruction of Artifacts from Digital Image Repositories," ACM J. Comput. Cult. Herit., vol. 1, No. 1, Nov. 2021, 17 pages.

* cited by examiner

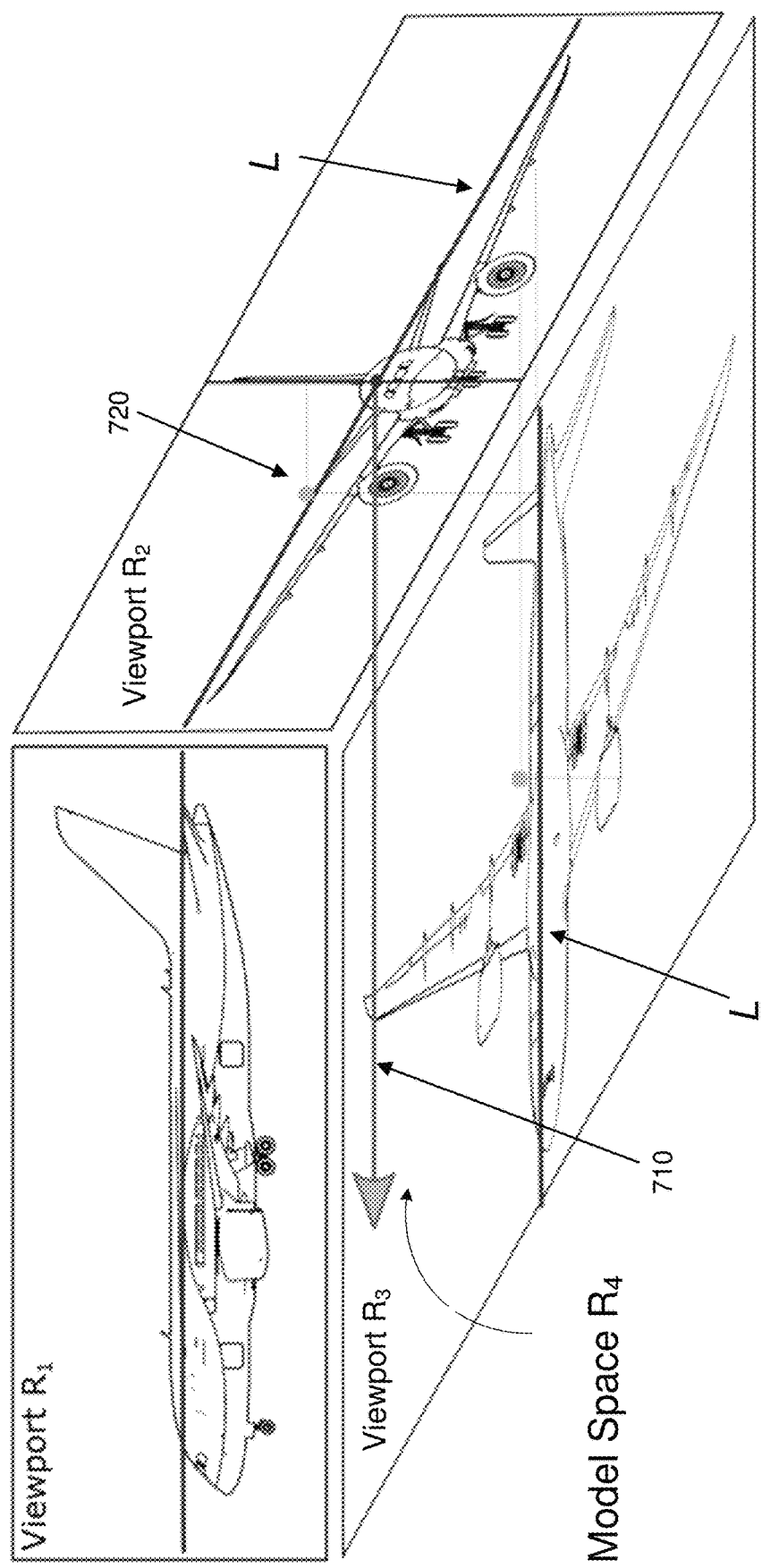

DOCUMENT SEARCH FOR DOCUMENT RETRIEVAL USING 3D MODEL

RELATED APPLICATIONS

This application claims priority of U.S. Patent Application No. 63/173,018 filed Apr. 9, 2021, and entitled, "DOCUMENT SEARCH USING 3D MODEL RECONSTRUCTION," which is incorporated herein by reference.

FIELD

This application relates to the field of document retrieval in general. More specifically, this specification applies to the use of document search and retrieval using three-dimensional (3D) models reconstructed from target objects.

BACKGROUND

Engineering drawings, scientific data, and governmental document repositories rely on degraded two-dimensional images to represent physical three-dimensional objects. For example, many databases used today, such as databases from national patent authorities, describe physical models of objects (e.g., in patents, industrial designs, and trademarks) as a multi-view set of images, such as front, rear, right and left sides, top and bottom views. Analysis of these images for the purpose of retrieval of similar objects poses a challenge to current systems. Multi-view images fail to completely represent how the individual images interrelate, e.g., to form the original object.

SUMMARY

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

Various technologies are described herein for reconstructing models of physical objects which are preserved or represented in pictorial records. The reconstructed models of these objects can be compared to existing physical models and/or other reconstructed models based on physical geometry. This comparison can be used for identification of the object through model retrieval or for classification of the object through model clustering. In some example implementations, these technologies can be applied to improve the retrieval of multi-view documents and 3D models. For example, an approximation of an object can be reconstructed as a point cloud, for example, from a multi-view image set Image and document retrieval can be improved (e.g., more accurate and effective) by using the reconstructed models. The use of 3D point cloud models can allow both local and global geometric properties of the object to be described in one or more feature vector representations. The one or more feature vector representations of the object can be used individually or in combination with other descriptors for retrieval and classification tasks. For collections that are unclassified or where differing classification systems are used, these vector representations can allow clustering of objects into meaningful groupings.

Additionally, neural networks can be used to allow the encoding of point clouds into one or more feature vectors that are abstract multi-dimensional or latent space representations of the model. Once encoded as one or more feature vectors within the neural network, tasks such as classification and segmentation can be performed on the one or more feature vectors. A direct method for the generation of the one or more feature vectors representing these point clouds is described herein. These encoded representations of the models stand as one or more feature vectors that can be directly compared or combined with other attributes for further analysis.

In some implementations, the one or more feature vectors can be added to collections as metadata providing additional tools for analysis. For example, document collections, transformed into point clouds, may be augmented with these one or more feature vectors. In some implementations, only the one or more feature vectors are stored. In this case, the reconstructed point cloud serves as an intermediary representation between the multi-view image and the one or more feature vectors and may be reconstructed as required.

BRIEF DESCRIPTION OF THE DRAWINGS

FIG. 7 depicts an example of a point chosen on a front view of an object and projected as a vector into a model space, resulting in a point added to the model space of a model point cloud.

DETAILED DESCRIPTION

Figure 1:
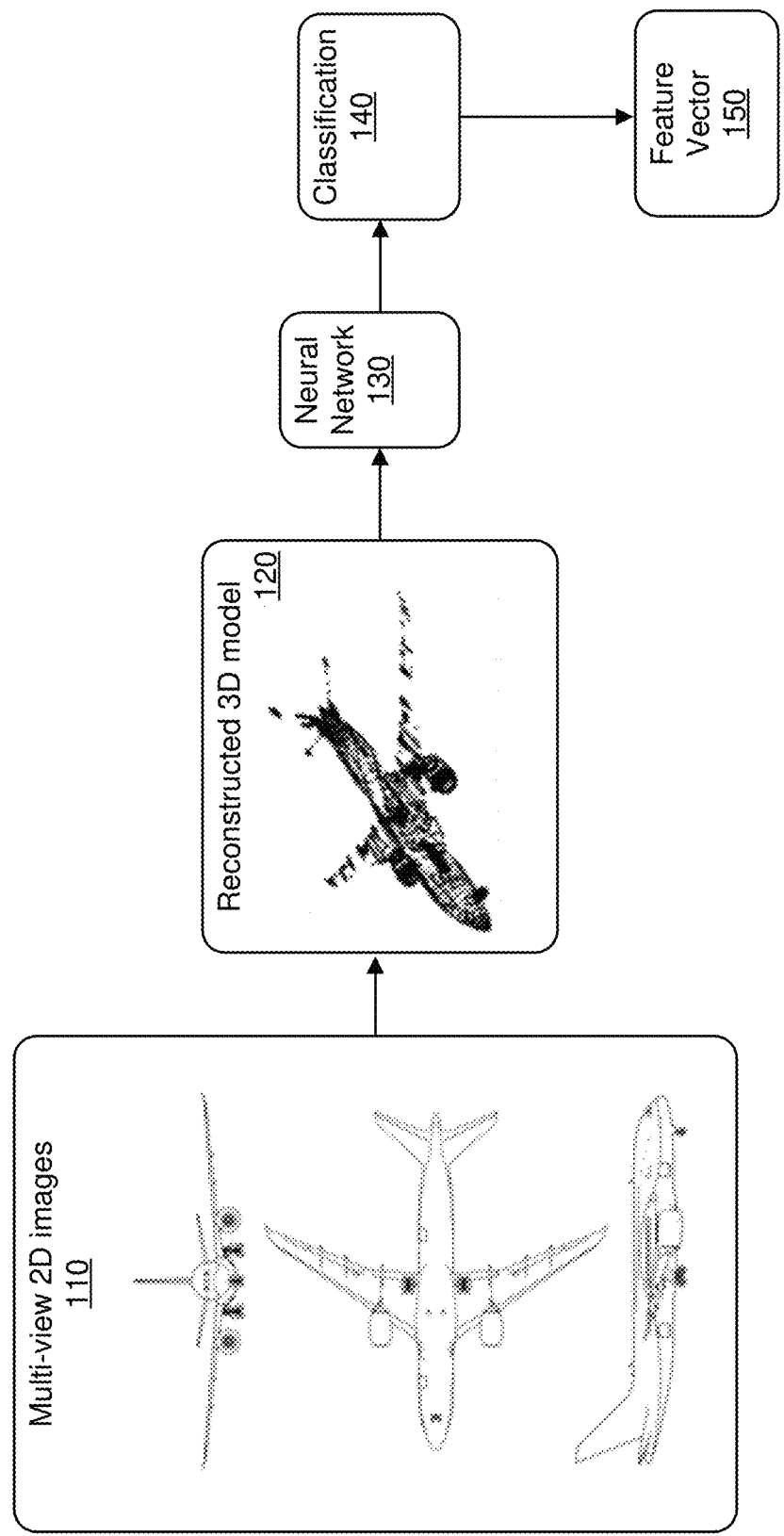
FIG. 1 is an example environment for reconstructing physical objects which are represented or preserved in line drawings.

The following description is directed to technologies for reconstructing physical objects which are represented or preserved in pictorial records, including photographic images or line drawings. For example, an approximation of an object can be reconstructed as a point cloud; for example, the technologies can use the multi-view line drawings of an original object to create a point cloud that closely approximates the surface of the original physical object. This approximation of the original surface is similar to the original object and allows more accurate comparisons to be performed than using the single-view or multi-view line drawings themselves.

In typical object reconstruction solutions, the reconstructed images are either a mesh object, a smooth and well (or exaggerated) contoured image, a line drawing, or a silhouette. With the mesh objects, the faces that define the outer object surface are neither uniform nor consistent. A naive method of generating a point cloud from a mesh model is to simply take the vertices of the model and use these as points in a point cloud. In the case of a cube, this would create only six points. No points would be located on the faces of the cube or along the cube's edges.

The typical object reconstruction solutions also cannot create a point cloud when the original model is unavailable. They require images to be taken from a consistent view and do not address scaling or rotation invariant features.

The technologies described herein provide improvements over such typical object reconstruction solutions. For example, the technologies can create a point cloud that represents the original model, e.g., by using the multi-view line drawings of the original object to create a point cloud that closely approximates the surface of the original physical object. The point cloud is a collection of points in a space which are distributed across the surface of the original 3D model. Points located on the surface and edge of the object provide context to the overall shape of the object.

Additionally, the technologies described herein also provide improvements with the use of neural networks.

FIG. depicts an example environment 100 for reconstructing models of physical objects which are represented or preserved in line drawings. The example environment 100 includes multi-view images 110 of an object, an airplane in this example. The multi-view images 110 can also be referred to as multi-view representation. The example multi-view images 110 include a front view, bottom view and right-side view of the object. Although three views are shown in this example, the multi-view images 110 can have any other number of views, for example, it can also include a top view and a left-side view. Although line drawing images 110 are depicted in this example, other pictorial images can also be used. The object in the multi-view images 110 is reconstructed into a 3D model as point cloud 120. The point cloud 120 is inputted into a neural network 130, e.g., without loss of generality, an image neural network or a convolutional neural network having multiple convolutional layers. The neural network 130 can classify (at 140) the point cloud 120 and transform the point cloud 120 into one or more feature vectors 150. The one or more feature vectors 150 represent the transformation of the point cloud 120 into different latent space representations. It is likewise within the scope of this disclosure to transform the point cloud into a set of one or more feature vectors 150, logically treating the set as one vector. The one or more feature vectors 150 can be a statistical representation of the point cloud 120. As will be described in more detail herein, the one or more feature vectors 150 can be used to assess the similarity of objects or images, and/or for image and/or document retrieval.

Although the example environment 100 shows the object represented in line drawings, the object can be represented in another pictorial record in place of the line drawings. When the representative line drawings lack certain views, these views can be generated or obtained, for example, from similar images or generic images. In some implementations, missing like drawings can be skipped or ignored.

In some implementations, the 3D model of the object can be a point cloud. Creating such a point cloud, in at least some scenarios, can result in a model of the physical object that is sufficiently similar to the physical object (or an original model of the physical object) to perform comparison and retrieval of a document containing the multi-view images, for example, by matching the one or more feature vectors. In at least some scenarios, document retrieval based on model reconstruction using a point cloud and its one or more feature vectors can be more effective than retrieval using the multi-view images on which the point cloud is based.

Figure 2:
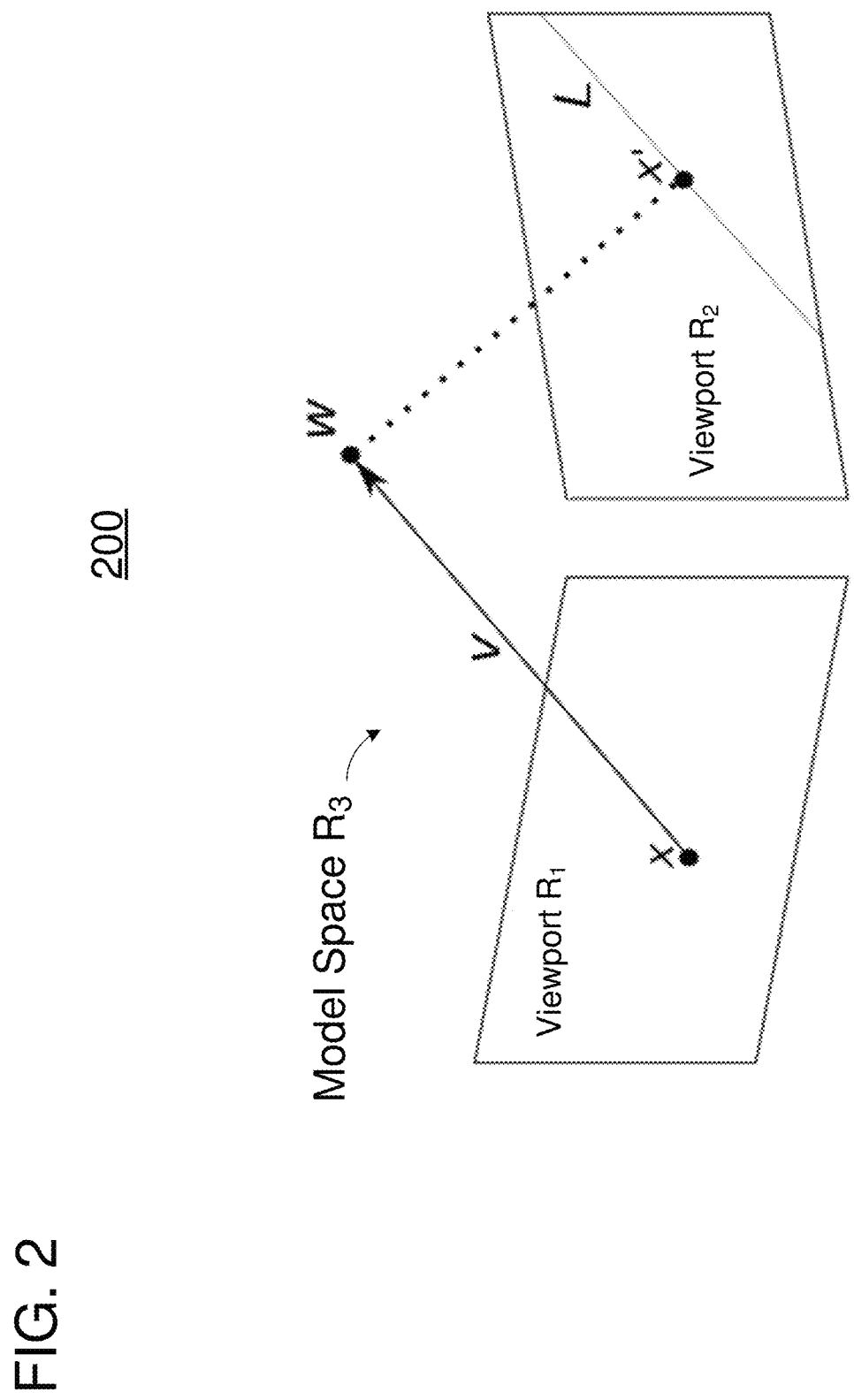
FIG. 2 is an example epipolar geometry having orthogonally aligned views.

In some implementations, a point cloud can be created using epipolar geometry. For example, as depicted in example 200 in FIG. 2, views can be orthogonally aligned. This implies a single point within a view can be represented as a line in any orthogonal image or view. A point w on the surface of the model in space $R_3$ can be selected from a point x in a drawing image in view $R_1$. This point can then be projected as a line v from x to w. The vector v can be viewed as a line L in an orthogonal view $R_2$, where point x' is the projection of w onto L.

Figure 3:
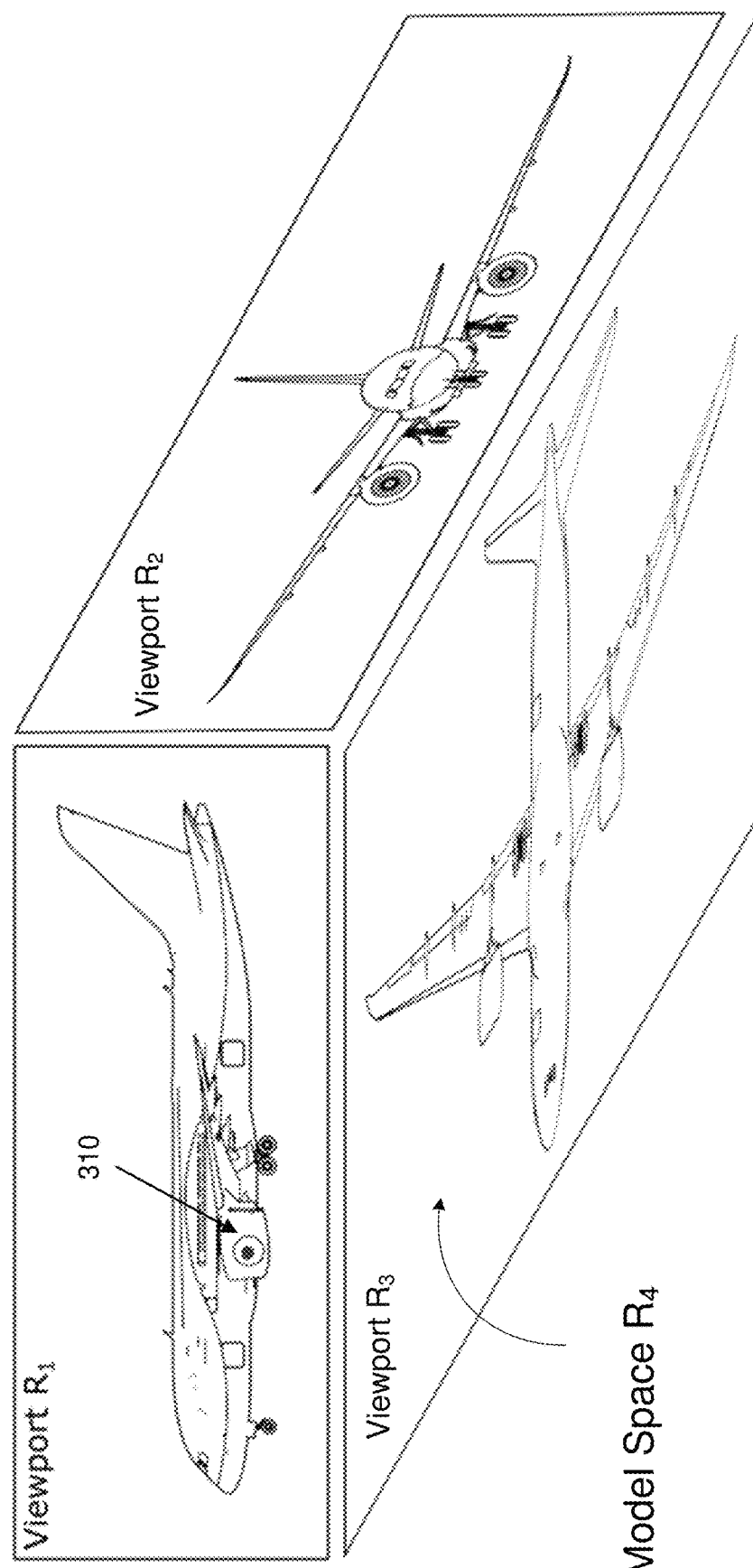
FIG. 3 depicts an example of multi-view images placed orthogonally around a cube that represents a model space.
Figure 4:
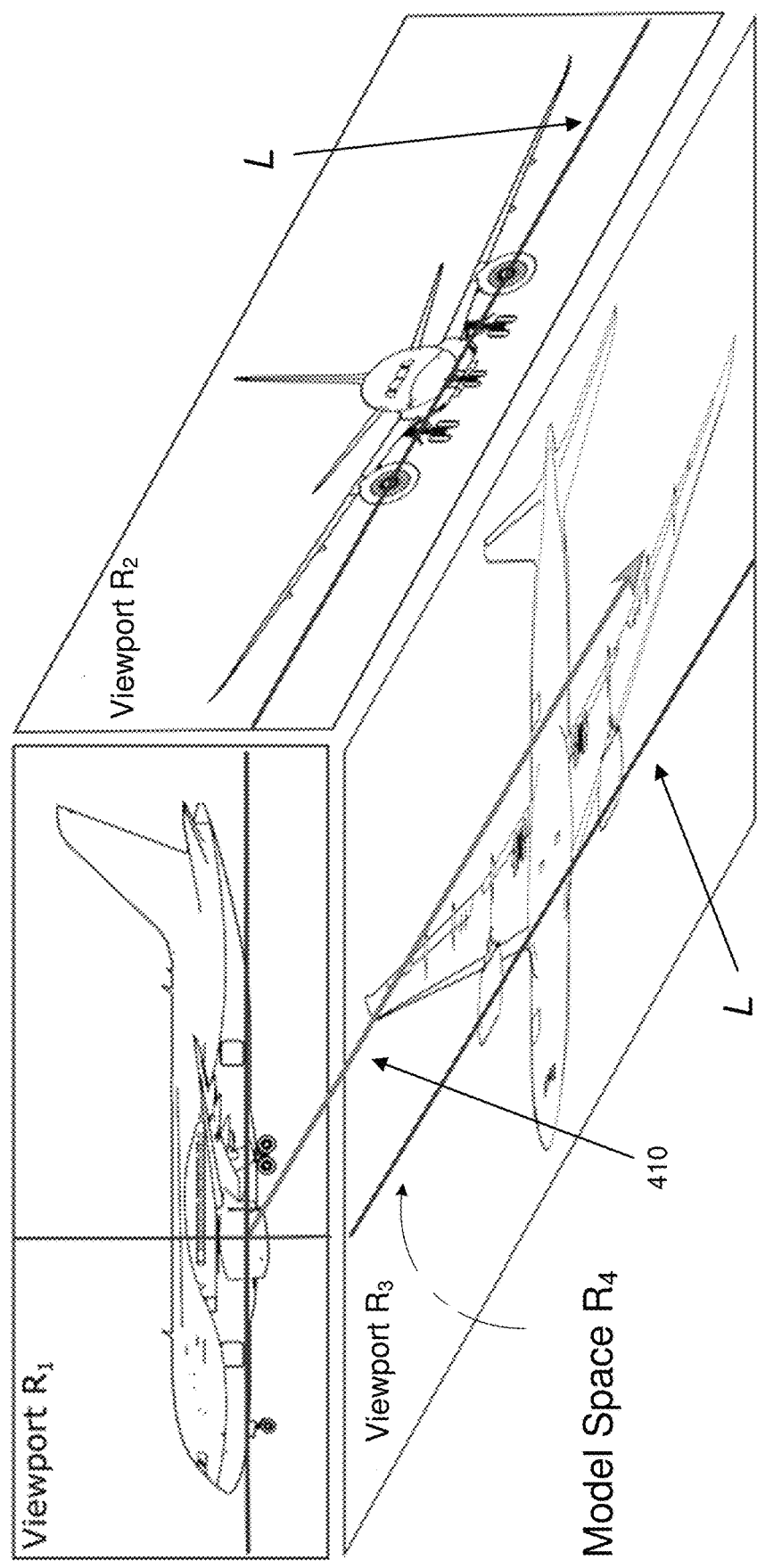
FIG. 4 depicts an example of a point chosen on a side view of an object and projected as a vector into a model space.
Figure 5:
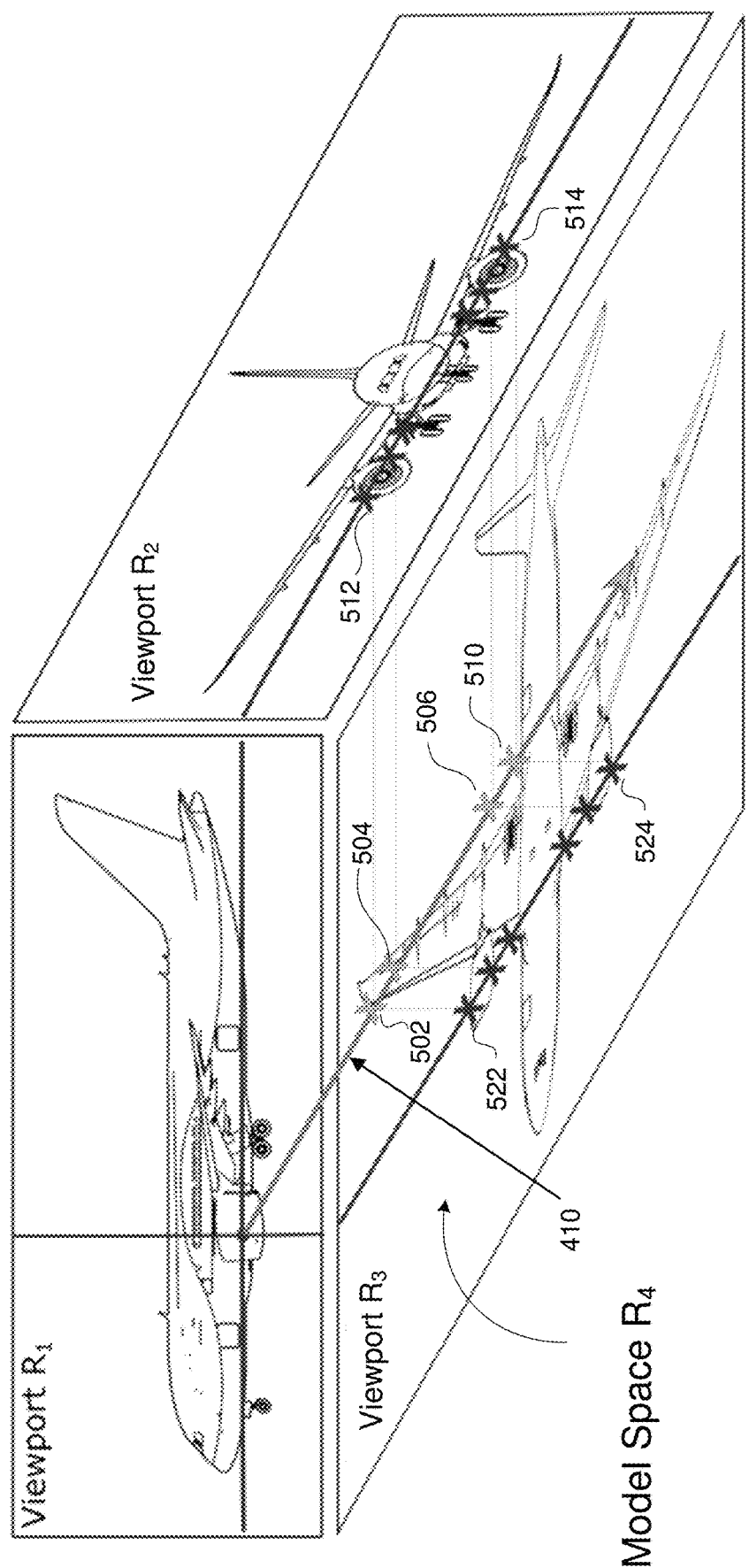
FIG. 5 depicts an example of multiple points chosen on a side view of an object and projected on a vector into a model space with potential candidates for a final point cloud.
Figure 6:
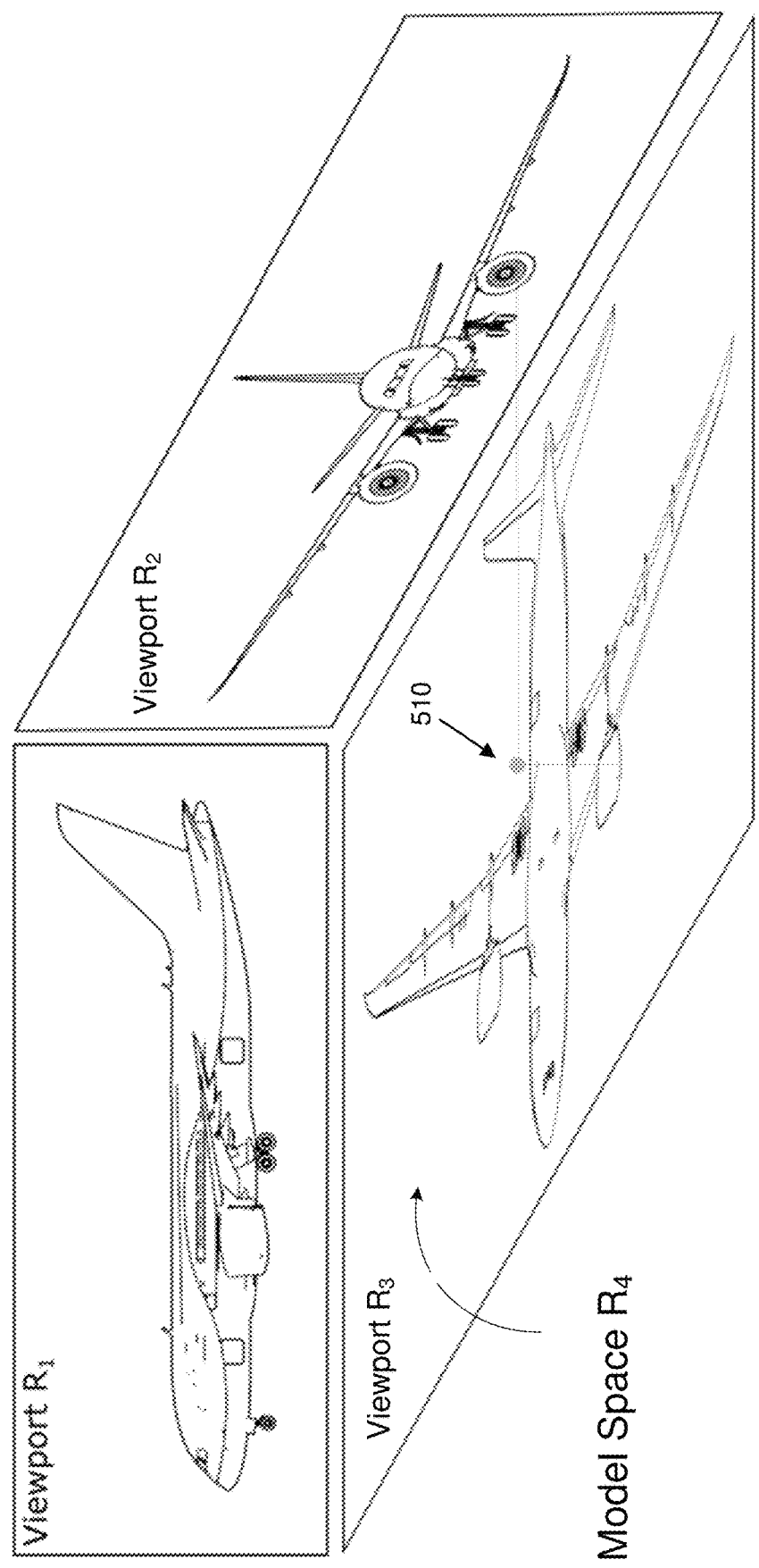
FIG. 6 depicts one point added to the model space of a model point cloud.

In FIGS. 3 to 7, using the multi-view images of an airplane as an example, the images from the side view (on viewport $R_1$), front view (on viewport $R_2$), and bottom view (on viewport $R_3$) are placed orthogonally around a cube that represents the $R_4$ model space. First, a point 310 is chosen on the side view of the object (on viewport $R_1$) and projected as a vector 410 into the model space $R_4$, as depicted in FIG. 4. This vector may be seen (projected) on the front view (on viewport $R_2$) and bottom view (on viewport $R_3$) as lines L. Since the technique generates the shell of the model, only points that are on the periphery of the images (e.g., surface and edge) are considered. In FIG. 5, by way of example, there are at least four points (502-510 Xs on vector 410) that are on the edges of both the front view (512-514 Xs on viewport $R_2$) and bottom view (522-524 Xs on viewport $R_3$). Each of these points 502-510 Xs on vector 410, e.g., point 510, can be candidates for the final point cloud. FIG. 6 depicts one point 510 added to the $R_4$ space of the model point cloud. FIG. 7 depicts another example where another point 720 is chosen from the front view (on viewport $R_2$) and projected again as a vector 710 into the model space $R_4$ of the model point cloud.

Using this technique, points can be iteratively sampled from the multi-view images to construct the final point cloud. The number of points that can be sampled can vary, for example, 256 points to 256,000 points. The upper limit on the number of points generated can depend on the resolution of the multi-view images. When the source images are in grayscale or color, the sampled points can sample the image grayscale or color as well. In some experimentations, a cloud point with 2,048 points can provide strongest overall retrieval, as measured by normalized discounted cumulative gain, however the number of points identified in these experiments is not intended to be a limiting factor in implementation.

Figure 8A:
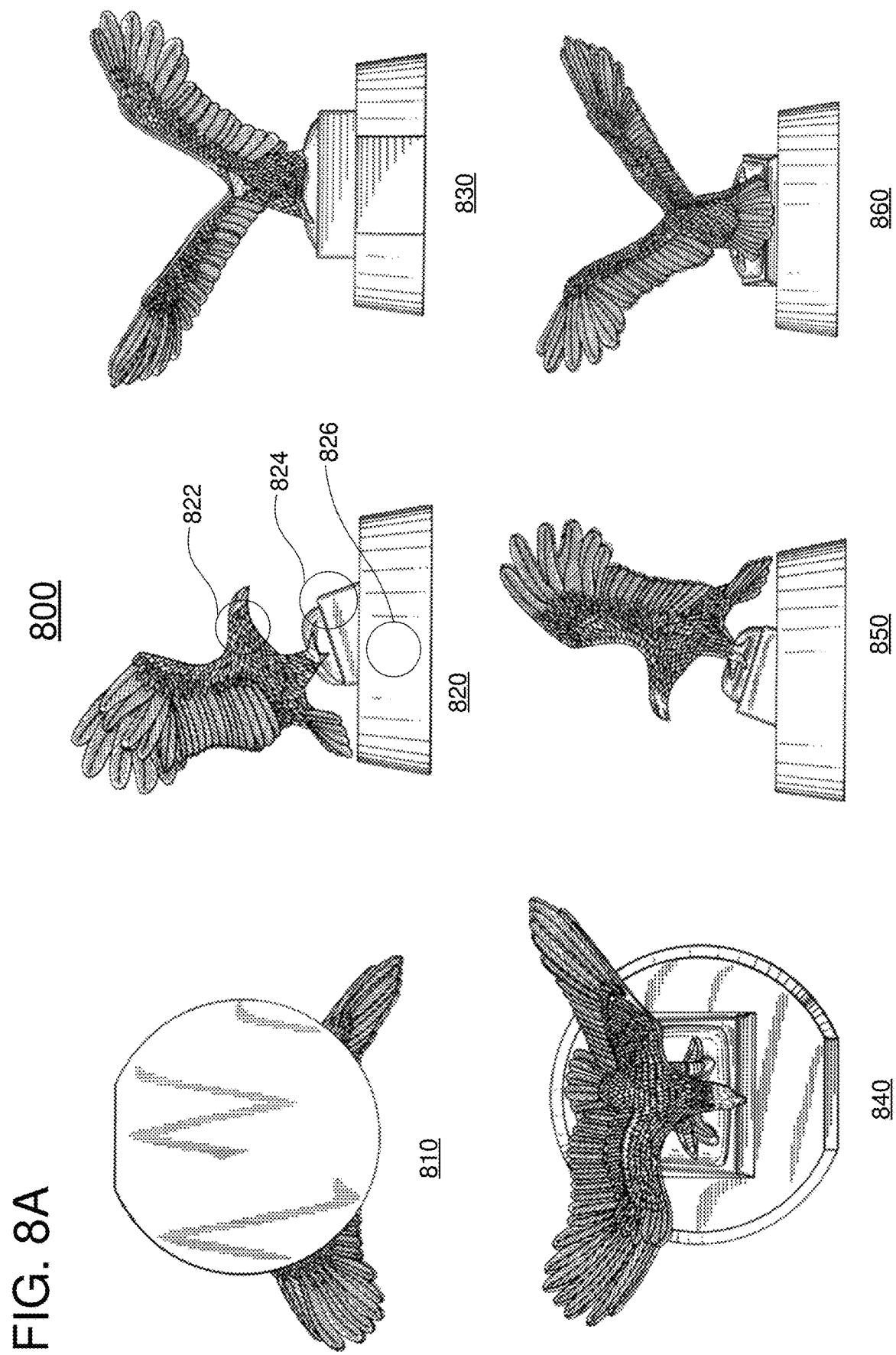
FIG. 8A depicts an example set of multi-view images.

An example multi-view set of images 800, as shown in FIG. 8A, can include a bottom view image 810, right view image 820, front view image 830, top view image 840, left view image 850, and back view image 860. The images included in the multi-view set of images 800 are not limited to these images and can include additional images. There are also cases where an original multi-view document contains fewer images. In some implementations, when a view is missing, a substitute can be generated. For example, an opposite but substantially similar view can be used in place of a missing view, e.g., substituting the right view image 820 for the left image 850. In some implementations, substitutions can include image manipulations such as horizontal or vertical flips are some other rotations. For cases where both a view and the opposite view are missing, a generic shape can be substituted. For example, a circular mask can be used for the top/under views of bowls and bottles and a square mask can be used for statues. For some objects, a square mask can be used missing front/back and left/right views. If the object's top or under views show sufficient radial symmetry, it is possible to use a front view in place of the side or back views. In some implementations, when the images are not to scale, they must be aligned such that the bounding boxes for each mask form a cuboid box. A common vertical, horizontal, and depth are established, and the images are scaled to meet these dimensions. If a mask is substituted for one or more views, the masks can be scaled as well. For some cases where a view is missing, an image from a similar multi-view document can also be used for substitution.

With respect to multi-view images, as shown in FIG. 3 and FIG. 8, it may not be required that a point 310 be chosen at random from the image. The selection of point 310 can be based on techniques that use both internal (e.g., texture region 822) and external knowledge for sampling and point distribution. For example, the techniques can sample more points for specified local regions such as texture regions 822, or the techniques can sample more points for surface with contours 826 than flat surfaces 824, etc. In the examples where the multi-view images contain environmental details (e.g., areas surrounding the main object), the techniques can distinguish and focus more on the object or specified local regions, for example, and sample more points on the object or the specified local regions.

Figure 8B:
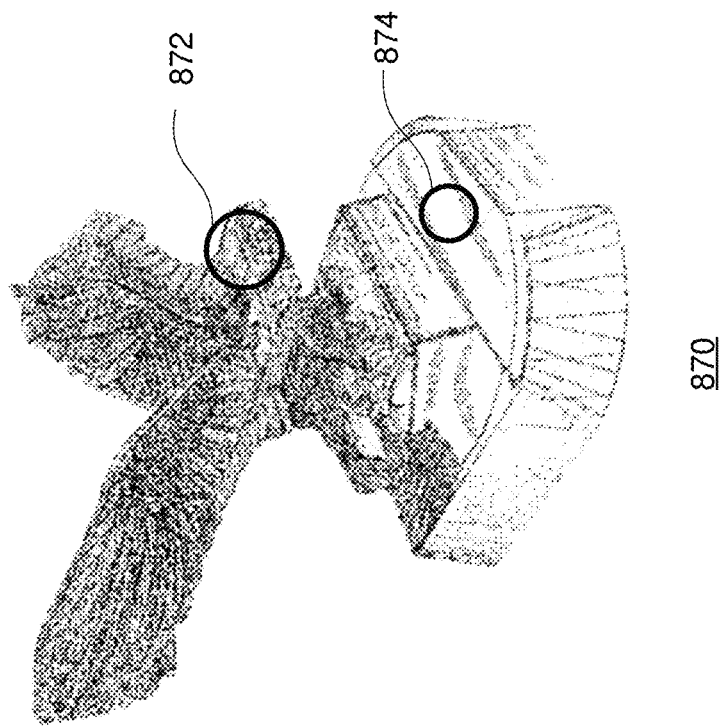
FIG. 8B depicts an example point cloud.

As shown in FIG. 8B, point cloud 870 representation can include arbitrary point cloud size, an arbitrary number of points, a non-uniform distribution of points, and an arbitrary scale or rotation. In a neural network setting, point clouds can be represented as a vector of points, in which the representation of individual points can be arbitrarily sorted. The vector representation of the individual points within the point cloud can vary depending on whether the point cloud is in color, grayscale, or black and white. The vector representation of the individual points within the point cloud can also include information in addition to position and color, such as normal vector, voxel or importance weight, and other descriptive elements. A neural network can generate a partitioning of the point set, abstract sets of points, or local features through a local feature learner. This can be accomplished through sampling and aggregation. By specifying the number of centroid points and the size of the neighborhood, point clouds can be up-sampled or down-sampled. The final result can be one or more feature vectors that summarize the point cloud. The techniques of the present disclosure can integrate both local and global features and include biased sampling of points to create the one or more feature vectors, such as object shape as well as local features such as corners, contours, density and resolution. The techniques can use both internal (e.g., texture 872) and external knowledge for sampling and point distribution. For example, the techniques can sample more points for specified local regions, or the techniques can sample more points for surface with dense regions of points 872 than sparse regions of points 874, etc. In the examples where the point cloud 870 contains dense regions of points 872 or sparse regions of points 874, the techniques can distinguish and focus more on the object or specified local regions, for example, and sample dense regions of points 872 on the object or the specified local regions. The techniques can encode the global and local features into one or more feature vectors.

Figure 9:
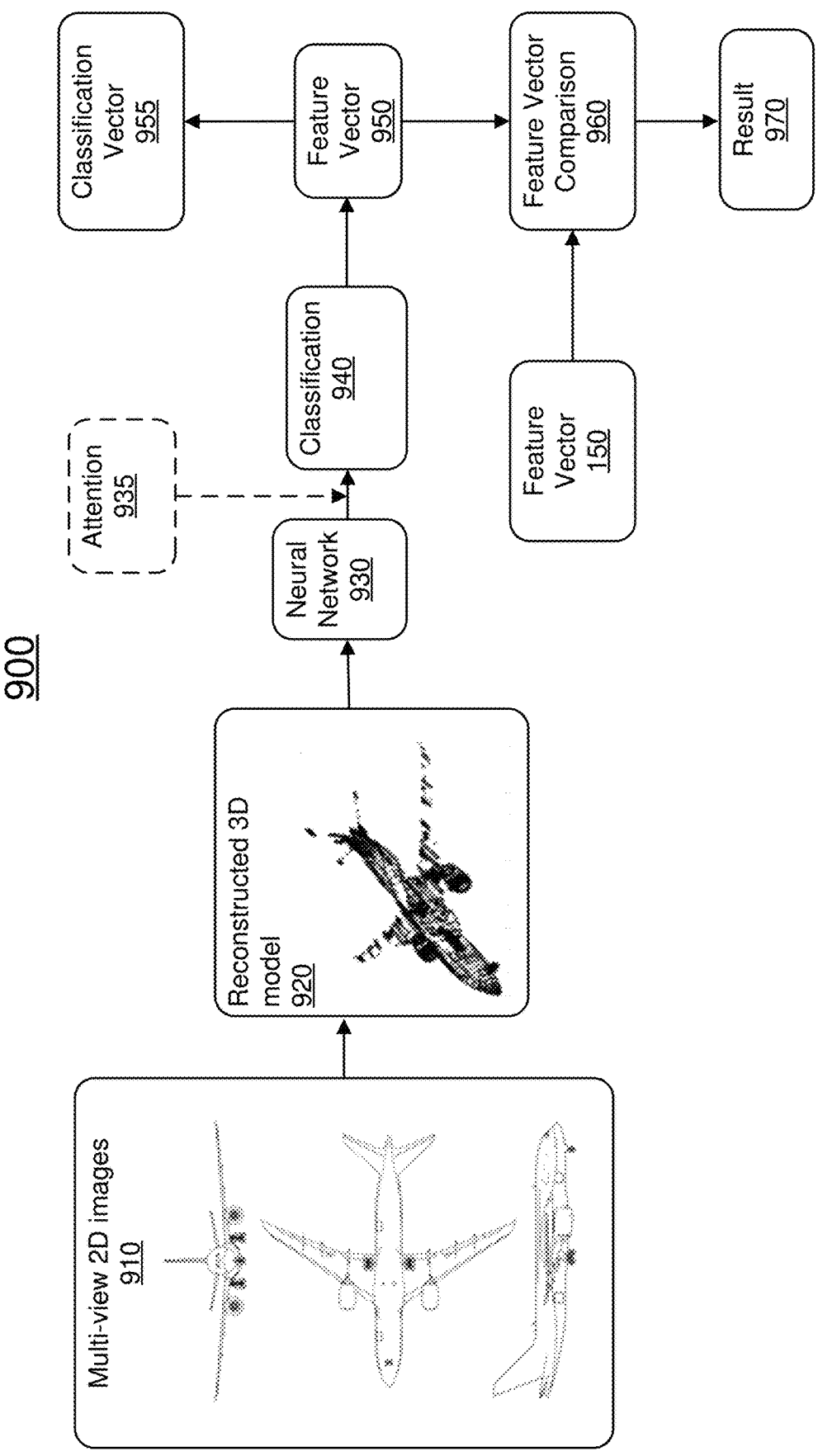
FIG. 9 depicts an example environment for reconstructing physical objects for the one or more feature vector comparisons.

In some implementations, as shown in FIG. 9, a final set of fully connected layers of a neural network can transform the one or more feature vectors 950 representations of the model into a final classification vector 955 that can represent the confidence that the original model belongs to this classification or distinctive feature. This portion of the network can be used to directly identify the classification of an object or can be trained to identify distinctive features of an object, such as whether it contains specific substructures (e.g., cones, wings, sharp edges, facial features, stylistic features, etc.).

In some implementations, the techniques of the present disclosure can train the network to create the one or more feature vectors 950 representations of the 3D model. The layer located immediately prior to the final layer can be a hidden layer, for example, of size 256. This layer can take the one or more feature vectors 950 representations of the 3D model as input and provide a classification or other distinctive feature recommendation as output. As the network is trained, this layer can be heavily biased to place the 3D model into a classification or identify the presence of a distinctive feature. This, in effect, can create one or more feature vectors 950 representations of the 3D model that are similar for similar classifications or distinctive features and create the encoding into the latent space. The encoding of the one or more feature vectors 950 representations of the 3D model can encapsulate common details from the classifications or distinctive features so that the one or more feature vectors 950 representations of the 3D model may be compared using, for example, cosine similarity or any other similarity measure, to determine similarity between 3D models and be used as a basis for similar model retrieval.

In FIG. 9, the example environment 900 can depict the pipeline for transforming the multi-view 2D images 910 into a reconstructed 3D model 920 and finally into one or more feature vectors 950 representations of the 3D model using a neural network model training as shown. For example, each set of multi-view 2D images 910 can be encoded as a reconstructed 3D model 920, represented as into one or more feature vectors 950 representations of the 3D model, and finally matched to the classifications or distinctive features associated with the multi-view 2D images 910. The classifications or distinctive features associated with the multi-view 2D images 910 may be based on a high-level grouping of the multi-view 2D images 910 (e.g., plane, car, bottle, face, person, etc.) For example, the classifications or distinctive features may be represented as a vector. Each of the classifications or distinctive features are represented as a single element in this vector. The multi-view 2D images 910 may belong to one or more classifications or distinctive features. Using standard neural network training methodologies, the full training set of multi-view 2D images 910 is used to refine the neural network to predict the correct classifications or distinctive features for any particular multi-view 2D images 910. Once the network is trained, it can be applied, for example, to multi-view 2D images 910 in the testing set. The techniques of the present disclosure can learn which points are more important, for example, for each class (or category) of object. The one or more feature vectors 950 representations of the 3D model corresponding to each collection of multi-view 2D images 910 can be extracted. The one or more feature vectors 950 representations of the 3D model can then be used in comparison using cosine similarity or any other similarity measure, for example, for retrieval and clustering tasks. Once the network has been trained, the testing set can be evaluated and the one or more feature vectors 950 representations of the 3D model corresponding to each collection of multi-view 2D images 910 can be stored along with any additional descriptive data, such as classifications or distinctive features. Through extensive experimentations and evaluations, the techniques of the present disclosure using the one or more feature vectors 950 representations of the 3D model are shown as more accurate and effective than other techniques, for example, for image and document retrievals.

The example environment 900 can also include reconstructing physical objects for feature vector comparison. For example, the example environment 900 includes multi-view images 910 of an object, an airplane in this example, which are represented or preserved in line drawings. The multi-view images 910 can also be referred to as multi-view representation. The example multi-view images 910 include a front view, bottom view and right-side view of the object. Although three views are shown in this example, the multi-view images 910 can have any other number of views, for example, it can also include a top view and a left-side view. Although line drawing images 910 are depicted in this example, other pictorial images can also be used. The object in the multi-view images 910 is reconstructed into a 3D model as point cloud 920. The point cloud 920 is inputted into a neural network 930, e.g., an image neural network. In some implementations, an attention mechanism 935 can be included. For example, the one or more feature vector outputs from the multi-view images 910 processed by network 930 can be fed to a fully connected general attention layer 935. This layer can learn a weighting for each feature to allow the one or more feature vectors that contribute more strongly to a final answer to be weighted more highly. The learned weighting of the one or more feature vectors can allow more discriminative views to contribute more to the final image analysis results. The neural network 930 can classify the point cloud 920 (at 940), and transform the point cloud 920 into one or more feature vectors 950. The one or more feature vectors 950 can be a statistical representation of the point cloud 920. The one or more feature vectors 950 can be used to assess the similarity of objects or images, and/or for image and/or document retrieval. In this example, the one or more feature vectors 950 can be compared (at 960) with the one or more feature vectors 150 (see FIG. 1). A result 970 can indicate whether and how the one or more feature vectors 150 and 950 are similar. The result can thus indicate whether the objects represented by the multi-view 2D images 110 and 910 are similar.

Figure 10:
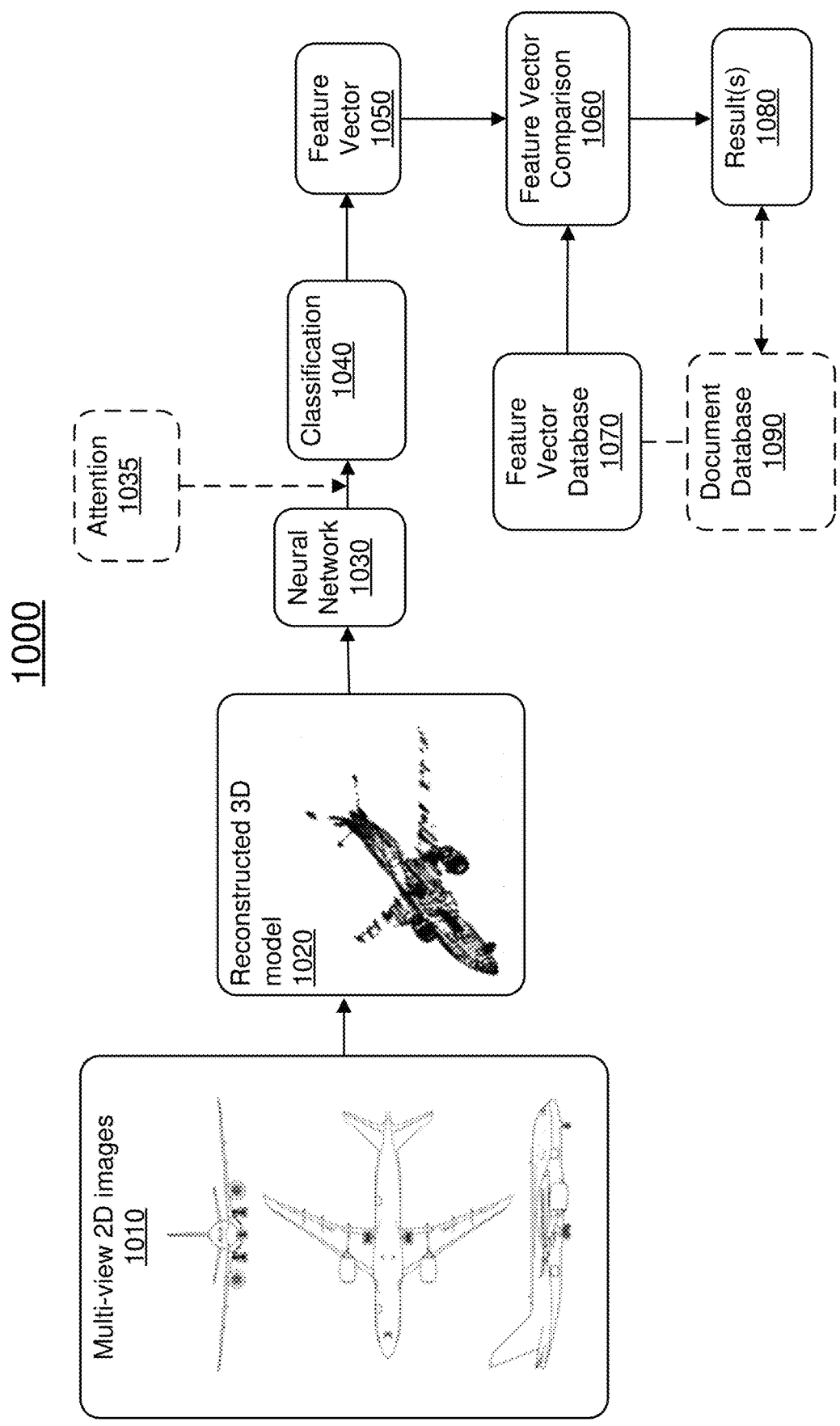
FIG. 10 depicts an example environment for reconstructing physical objects for document retrieval.

FIG. 10 depicts an example environment 1000 for reconstructing physical objects for document retrieval. The example environment 1000 includes multi-view images 1010 of an object, an airplane in this example, which are represented or preserved in line drawings. The multi-view images 1010 can also be referred to as multi-view representation. The example multi-view images 1010 include a front view, bottom view and right-side view of the object. Although three views are shown in this example, the multi-view images 1010 can have any other number of views, for example, it can also include a top view and a left-side view. Although line drawing images 1010 are depicted in this example, other pictorial images can also be used. The object in the multi-view images 1010 is reconstructed into a point cloud 1020. The point cloud 1020 is inputted into a neural network 1030, e.g., an image neural network. In some implementations, an attention mechanism 1035 can be included. For example, the one or more feature vector outputs from the multi-view images 1010 processed by network 1030 can be fed to a fully connected general attention layer 1035. This layer can learn a weighting for each feature to allow the one or more feature vectors that contribute more strongly to a final answer to be weighted more highly. The learned weighting of the one or more feature vectors can allow more discriminative views to contribute more to the final image analysis results. The neural network 1030 can classify the point cloud 1020 (at 1040) and transform the point cloud 1020 into one or more feature vectors 1050. The one or more feature vectors 1050 can be a statistical representation of the point cloud 1020. The one or more feature vectors 1050 can be used to assess the similarity of objects or images, and/or for image and/or document retrieval. In this example, the one or more feature vectors 1050 can be used in a document search. For example, the one or more feature vectors 1050 can be compared (at 1060, e.g., using one or more feature vectors 1050 as a query vector in a search engine) with one or more feature vectors 1050 in a feature vector database (or library) 1070. In some implementations, the result 1080 from the comparison can include one or more vector features most matched with the one or more feature vectors 1050. The result 1080 can be used to search a document database 1090, for example, for the document(s) associated with the one or more feature vectors in the result 1080. In some implementations, the feature vector database 1070 can be coupled to document database 1090. In some implementations, the one or more feature vectors 1050 can be added to the document database 1090 as metadata. The document database 1090 can include any type of document, for example, texts, images, videos, etc.

In some implementations, the comparison 1060 can also use a classification or distinctive feature comparison, or a combination of these comparisons. The one or more feature vectors 1050 can be compared using, for example, cosine similarity, Euclidean distance, or any other similarity measure without limitation. The one or more feature vectors 1050 can be used as a query vector, with all other one or more feature vectors 1050 in the feature vector database 1070 sorted by cosine similarity, Euclidean distance, or any other similarity measure.

Figure 11:
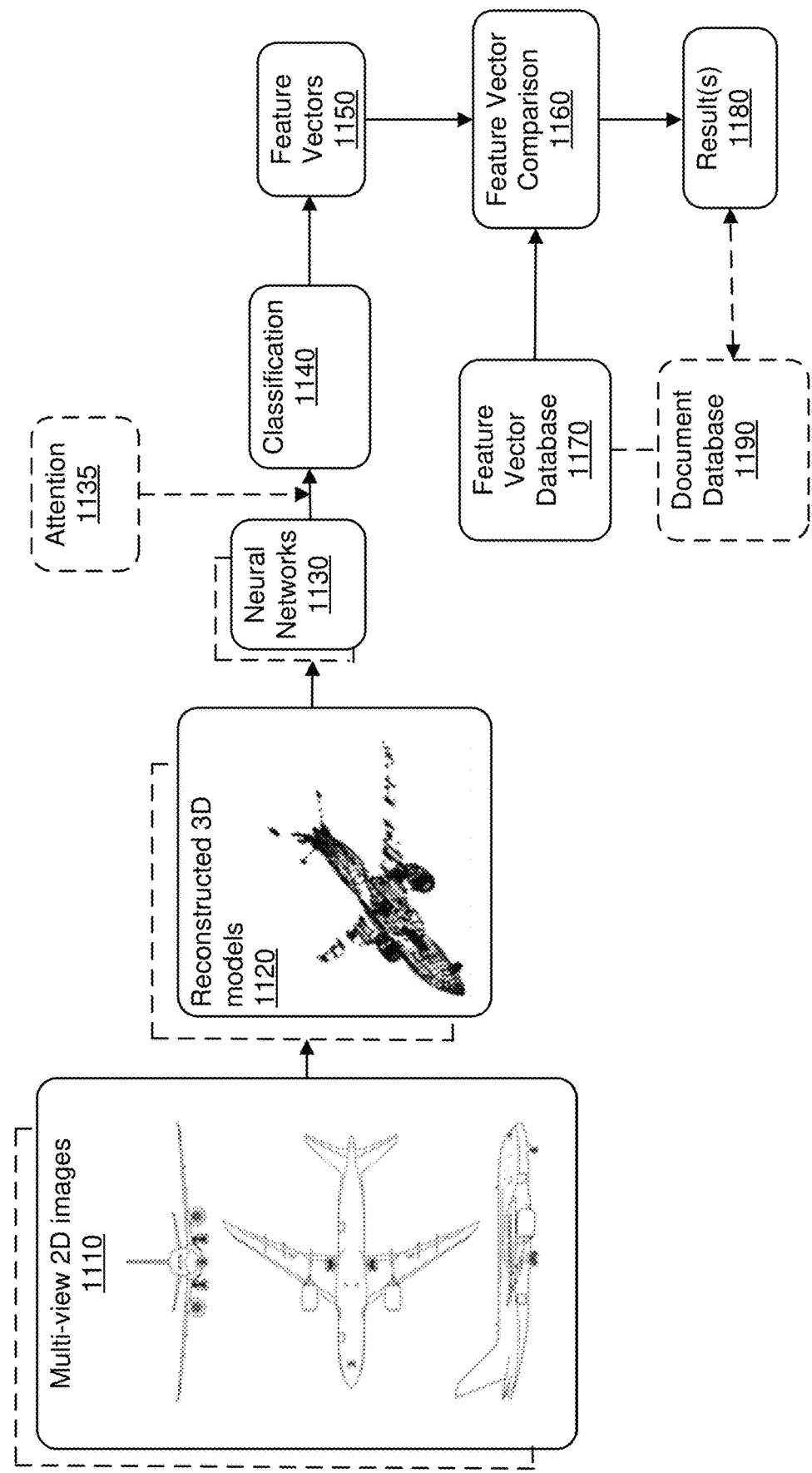
FIG. 11 depicts an example environment for reconstructing physical objects for document retrieval, using clustering.

FIG. 11 depicts an example environment 1100 for reconstructing physical objects for document retrieval, using clustering. Clustering can be desired in some implementations, for example, in clustering of original objects or their multi-view 2D images. The example environment 1100 includes clusters of multi-view images 1110. One cluster can include airplanes in this example. Other clusters can include other different objects or objects clustered based on distinctive features. The objects in the multi-view images 1110 of all objects in each cluster are reconstructed into respective 3D model point clouds 1120. The 3D model point clouds 1120 are inputted into one or more neural networks 1130, e.g., image neural networks. An attention mechanism 1135 can be included. For example, the one or more feature vector outputs from the multi-view images 1110 processed by networks 1130 can be fed to a fully connected general attention layer 1135. This layer can learn a weighting for each feature to allow the one or more feature vectors that contribute more strongly to a final answer to be weighted more highly. The learned weighting of the one or more feature vectors can allow more discriminative views to contribute more to the final image analysis results. The neural networks 1130 can then classify the 3D model point clouds 1120 (at 1140) and transform the 3D model point clouds 1120 into the one or more feature vectors 1150.

In some implementations, a dendrogram can be used to explore the hierarchical relationships of the one or more feature vectors. The one or more feature vectors can then be compared by progressively combining nearest neighbors into clusters. Initially each point can be considered its own cluster. To combine clusters, the 'single point' method can look for the closest points i and j from clusters u and v such that $d(u, v)=\min(\forall i \in u\ \forall j \in vd\ (u[i], u[j])$, namely, a point in the first cluster closest to a point in the other cluster. By iteratively combining clusters, it is possible to identify model similarities that are not captured by direct retrieval. It should be noted that the encoded point cloud is the basis for the one or more feature vectors. The clustering is conducted over the one or more feature vectors generated in the last layer of the neural network model.

In some implementations, a dendrogram may be created can be based on the one or more feature vectors 850. Models that connect to other groupings can be related by grouping but not as closely to other models. The longer legs of the dendrogram leaves can indicate an overall weaker similarity between the models. The dendrogram can be divided into groupings, for example, groupings based on classifications (e.g., statues, bowls, etc.) or distinctive features. One or more groups of models can show no definitive clusters of models. It should still be noted that even with the inaccurate higher-level groupings, the nearest neighbors for most models can be still within the same classifications or distinctive features. Model clustering can show a much stronger similarity measure between individual models and groupings. Models that connect directly in the dendrogram have the strongest similarity. The shorter legs of the dendrogram leaves can indicate a stronger similarity between objects.

Figure 12:
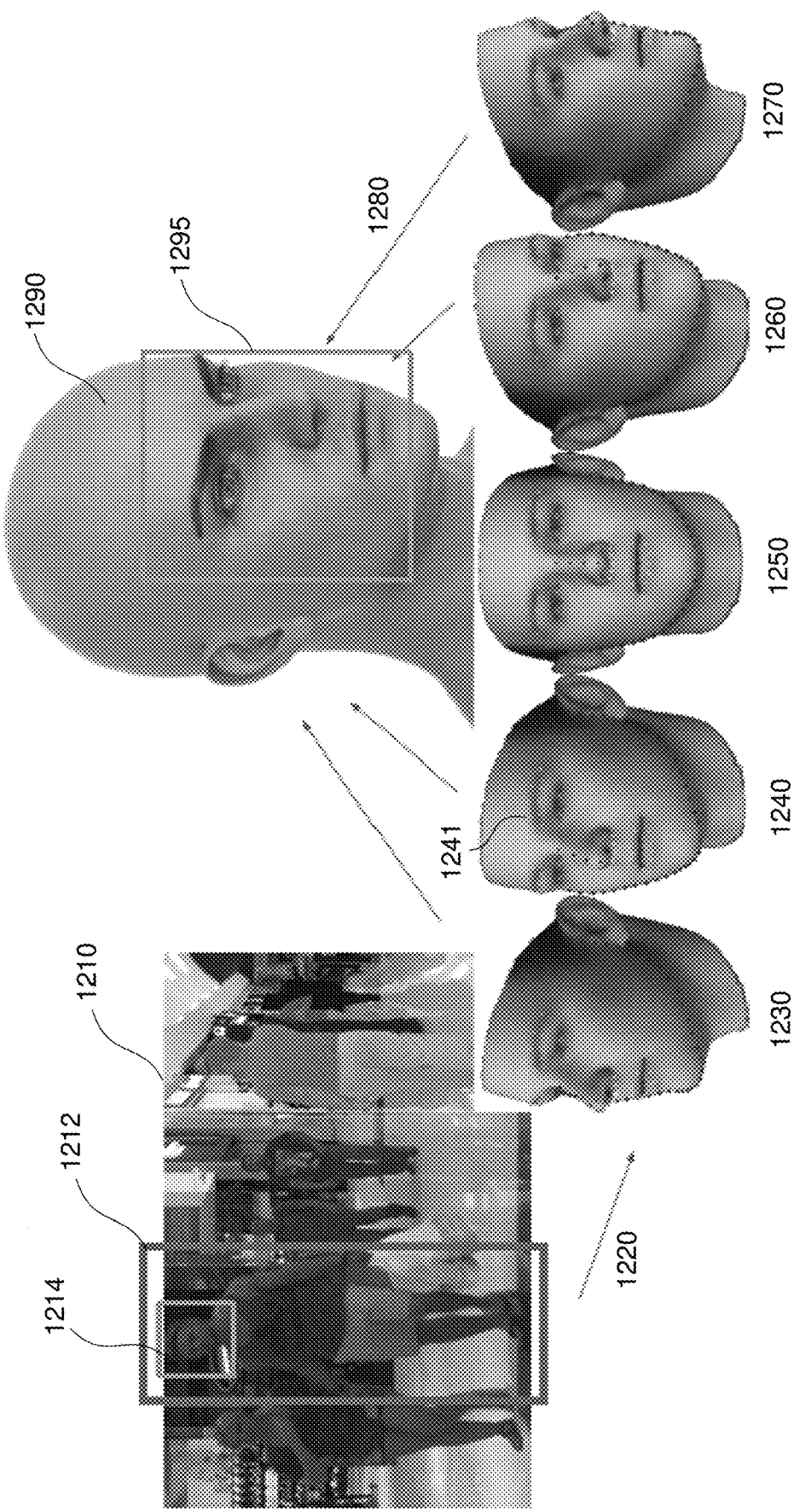
FIG. 12 depicts an example environment for reconstructing images for facial recognition.

As described above, the techniques described herein can be implemented in image and document comparisons and searches. Document as used herein can include any type of document, for example, texts, images, videos, etc. Images can also include human bodies, faces, etc. As such, the techniques described herein can be used for facial recognition. For example, as shown in FIG. 12, the object 1214 and its multi-view images 1230-1270 can be those of human heads and faces. 3D model 1290 of these heads and faces can be reconstructed into point clouds and encoded into one or more feature vectors as described herein. Tasks such as classification and segmentation can also be performed. These one or more feature vectors can be used to perform facial recognition and searches.

Images taken from low quality security cameras make identification of individuals within a video sequence difficult. As shown in the example 1200 of FIG. 12, cameras can only capture a portion of the face 1214 from a specific angle. Due to the location of security cameras, which attempt to capture large areas of a location, the size of the face within the image is often small. Additionally, portions of the face are often obscured.

In some implementations, by tracking an individual, e.g., individual 1212, within a video feed, the facial features from the target individual 1212 within each image 1210 can be collected. The angle of the target individual 1212's face relative to the camera can be determined for each image 1210, the image of the face 1214 may be extracted from the complete surveillance image 1210, and the facial images 1214 may be sorted (at 1220) from left to right and top to bottom to create a set of facial images 1230-1270 for the target individual 1212. Corresponding points (point 1241 shown as single example) within these images are identified and represented (at 1280) as 3D points within the facial model 1290. Because the correspondence between multiple facial images is used, these 3D points create a point cloud model (not shown) that is of high resolution.

In some implementations, this point cloud can be used directly for facial recognition or can be transformed back into a facial image 1295 that is of higher resolution than the original images. The reconstructed facial images provide a super-resolution 3D model of the face, resulting in a dense point cloud representation that can be easily converted to an image of the face from any angle. The techniques of the present disclosure can combine multiple facial images, all of which are partial representations in low quality, into a single dense representation that fills in facial features and provides fine detail of the underlying face.

In some examples, not all contours require the same resolution for identification. Thus, some varied facial components can be sampled at a higher resolution than some others; and less meaningful and less varying facial components can be sampled at a lower rate. Sampling variation can provide for higher resolution when needed while reducing the overall computation. The choice to sample at a higher resolution may be guided by the information density, color information, and other data extracted directly from the sampled images. Additionally, external knowledge regarding the regions to be sample can be employed to guide the sampling process. External knowledge, without loss of generality, can be made available by the environment involved (e.g., nature scene or crowded mall or shadow or evenly lit), image capture capability (as dependent on the characteristics of the imaging device), application nature (surveillance of a given person), etc. For example, without loss of generality, assume that in a surveillance application we know that the person of interest 1212 should have a particular scar or a tattoo on their left cheek. In such a case, the region containing the left cheek would be sampled at a higher resolution so as to provide a better image of the expected potential marking.

Additionally, when tracking an individual within a video feed, the identified facial images of the target individual can be streamed to a facial reconstruction engine. Once a sufficient number of facial images have been collected, the facial reconstruction engine can begin sampling points. Any new facial images collected from the target individual can be added to the set of facial images for the target individual. As points are sampled from the progressively increasing set of facial images, the sampling rate of different facial regions can be varied so that the points generated from the initial facial images do not outweigh the points generated by the later facial images. This sampling can happen within the constraints of the super-resolution sampling previously discussed. In some implementations, the facial reconstruction engine can be implemented in block 960 of FIG. 9, In the technologies described herein, methods can be provided for reconstructing physical objects which are represented or preserved in pictorial records, including photographic images or line drawings.

Figure 13:
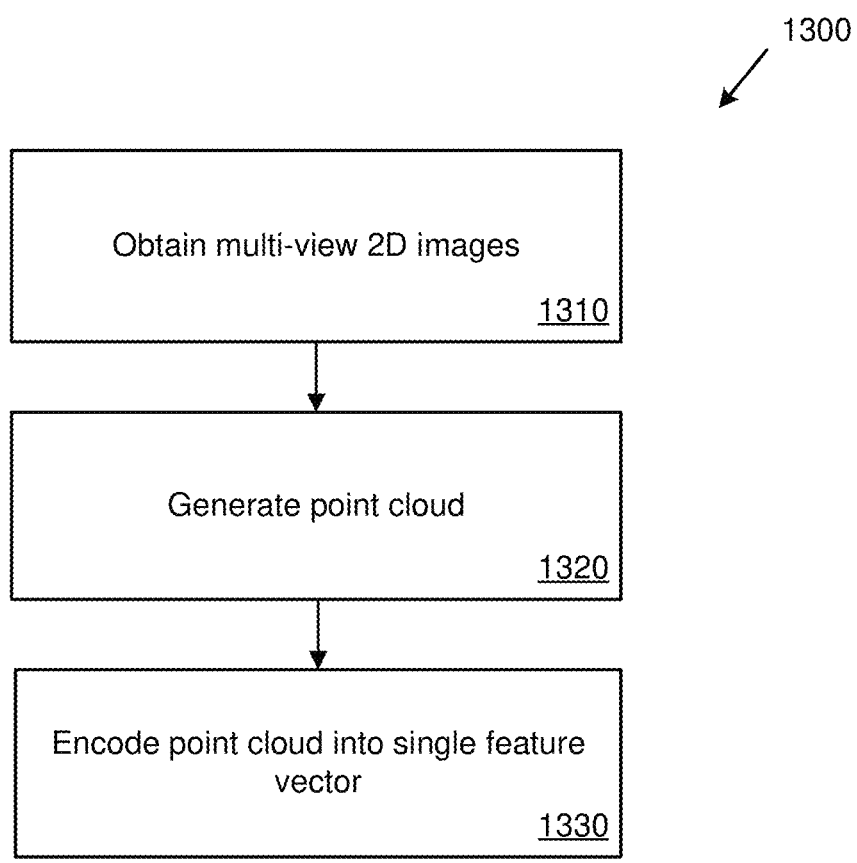
FIG. 13 is a diagram depicting an example process for reconstructing physical objects.

FIG. 13 is a diagram depicting an example process 1300 for reconstructing physical objects. At 1310, multi-view 2D images of an object to be reconstructed can be obtained. In some implementations, line drawings images can be obtained, for example, from the United States patent database, or generated. However, other pictorial records, e.g., photos, can also be used. When views are missing, substitutes can be generated as described above.

At 1320, the object in the multi-view images can be reconstructed into a 3D model point cloud. In some implementations, the point cloud can be inputted into a neural network, e.g., an image neural network. The neural network can classify the 3D model point cloud.

At 1330, the point cloud can be encoded into one or more feature vectors. The one or more feature vectors can be a statistical representation of the 3D model point cloud. In some embodiments, the process 1300 can integrate both local and global features and include bias sampling, such as object shape as well as local features such as corners, contours, density and resolution. The process 1300 can use both internal and external knowledge for sampling and point distribution. For example, the process can sample more points for surface with contours than flat surface, and focus more on the object, for example, sample more points on the object and not the surrounding environment.

Figure 14:
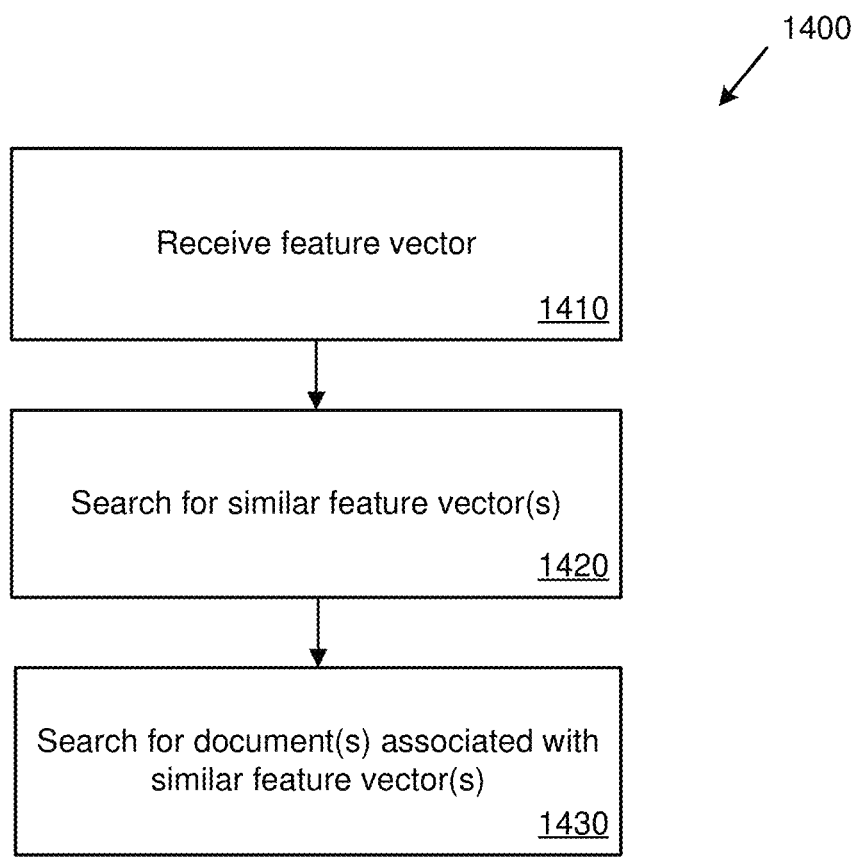
FIG. 14 is a diagram depicting an example process for document search using one or more feature vectors.

FIG. 14 is a diagram depicting an example process 1400 for document search using one or more feature vectors. At 1410, one or more feature vectors are received, for example, one or more feature vectors as encoded in process 1300 of FIG. 13.

At 1420, the process 1400 can include searching for similar vectors stored in a vector database (or library). For example, the one or more feature vectors can be used as a query vector in a search engine. In some implementations, the one or more feature vectors can be compared using cosine similarity or any other distance measurement known in the art. In these implementations, the one or more feature vectors in the feature vector database can be sorted by cosine or any other distance measurement known in the art. In some implementations, each result can be considered a match if it shares the class of the query vector and not a match if it belongs to a different class.

At 1430, the process 1400 can include searching a document database (or library) for the documents associated with the one or more feature vectors considered as similar or matched at 1420. The documents can include any type of document, for example, texts, images, videos, etc. Images can also include human bodies, faces, etc.

Figure 15:
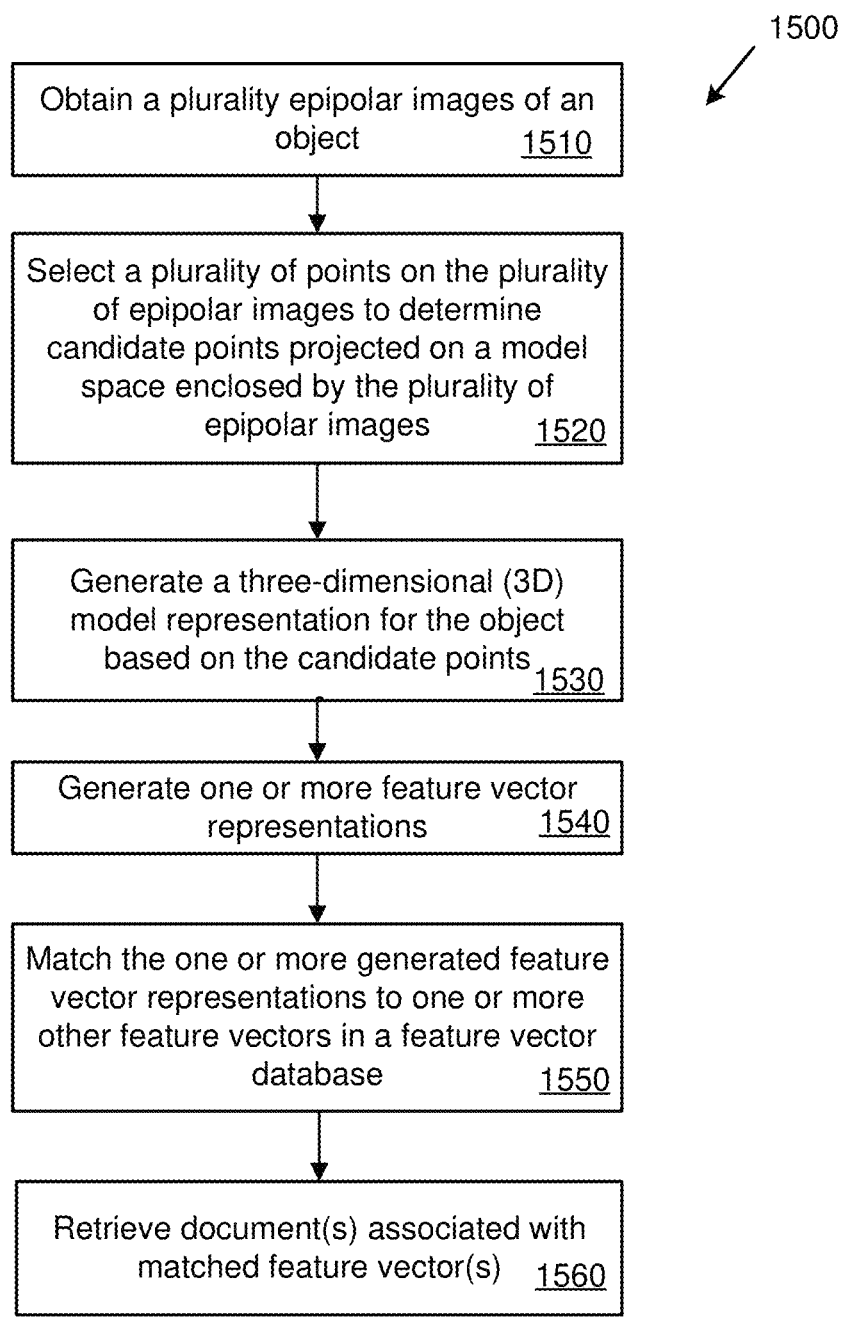
FIG. 15 is a diagram depicting an example process for reconstructing physical objects for document retrieval.

FIG. 15 is a diagram depicting an example process 1500 for reconstructing physical objects for document retrieval. For example, at 1510, a plurality epipolar images of an object can be obtained, for example, as shown in the example in FIG. 3. In some implementations, line drawings images can be obtained or generated. However, other pictorial records, e.g., photos, can also be used. When views are missing, substitutes can be generated as described above. In some implementations, the images can be orthogonally aligned.

At 1520, a plurality of points on the plurality of epipolar images can be selected to determine candidate points projected on a model space enclosed by the plurality of epipolar images, for example, as shown in the example in FIG. 5.

At 1530, a 3D model representation for the object based on the candidate points can be generated. At 1540, one or more feature vector representations of the object can be generated.

At 1550, the one or more generated feature vector representations can be matched to one or more other feature vectors in a feature vector database. At 1560, a document associated with the one or more matched feature vectors can then be retrieved.

Computing Systems

Figure 16:
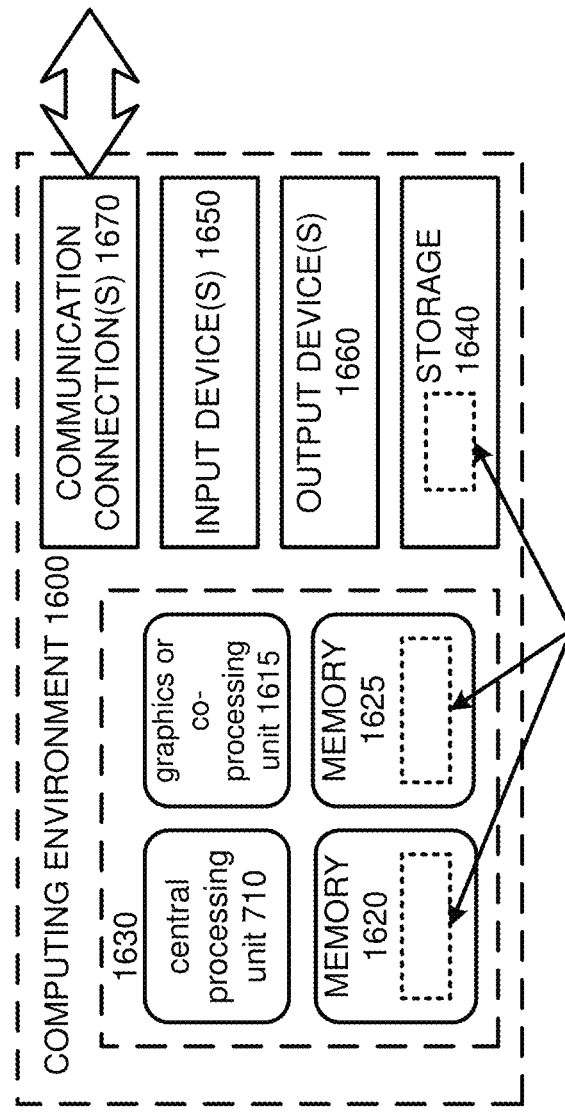
FIG. 16 is a diagram of an example computing system in which some described embodiments can be implemented.

FIG. 16 depicts a generalized example of a suitable computing system 1600 in which the described innovations may be implemented. The computing system 1600 is not intended to suggest any limitation as to scope of use or functionality, as the innovations may be implemented in diverse general-purpose or special-purpose computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), nonvolatile memory (e.g., ROM, EEPROM, flash memory, etc.), or some combination of the two, accessible by the processing unit(s). The memory 1620, 1625 stores software 1680 implementing one or more innovations described herein, in the form of computer-executable instructions suitable for execution by the processing unit(s).

A computing system may have additional features. For example, the computing system 1600 includes storage 1640, one or more input devices 1650, one or more output devices 1660, and one or more communication connections 1670. An interconnection mechanism (not shown) such as a bus, controller, or network interconnects the components of the computing system 1600. Typically, operating system software (not shown) provides an operating environment for other software executing in the computing system 1600, and coordinates activities of the components of the computing system 1600.

The tangible storage 1640 may be removable or non-removable, and includes magnetic disks, magnetic tapes or cassettes, CD-ROMs, DVDs, or any other medium which can be used to store information in a non-transitory way and which can be accessed within the computing system 1600. The storage 1640 stores instructions for the software 1680 implementing one or more innovations described herein.

The input device(s) 1650 may be a touch input device such as a keyboard, mouse, pen, or trackball, a voice input device, a scanning device, or another device that provides input to the computing system 1600. For video encoding, the input device(s) 1650 may be a camera, video card, TV tuner card, or similar device that accepts video input in analog or digital form, or a CD-ROM or CD-RW that reads video samples into the computing system 1600. The output device(s) 1660 may be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections, such as 1570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, the method comprising:
   obtaining one or more images of an object;
   generating a three-dimensional (3D) model for the object based on the one or more images of the object;
   generating one or more feature vector representations of the object;
   matching the one or more feature vector representations to one or more other feature vectors; and
   based on the matching, identifying one or more documents having one or more feature vectors that most closely match the one or more feature vector representations generated for the object,
   wherein the 3D model is represented by a point cloud,
   wherein the one or more images of the object include one or more epipolar views, and
   wherein the generating the 3D model represented by the point cloud for the object comprises:
      selecting a point on a first view of the one or more epipolar views;
      projecting a vector from the selected point into a model space;
      projecting the vector onto at least one view of the one or more epipolar views which is not the first view; and determining candidate points on the vector for the point cloud.

2. The method of claim 1, wherein the selected point is on a periphery of the object.

3. The method of claim 1, wherein the model space is enclosed by the one or more epipolar views.

4. The method of claim 1, wherein the selected point is based on a determined bias.

5. The method of claim 4, wherein the determined bias includes surface color, surface texture, or specified local region.

6. The method of claim 1, wherein each of the one or more other feature vectors is associated with a document.

7. A non-transitory computer-readable medium storing instructions for executing a method, the method comprising:
    obtaining one or more images of an object;
    generating a three-dimensional (3D) model for the object based on the one or more images of the object;
    generating one or more feature vector representations of the object;
    matching the one or more feature vector representations to one or more other feature vectors; and
    based on the matching, identifying one or more documents having one or more feature vectors that most closely match the one or more feature vector representations generated for the object,
    wherein the 3D model is represented by a point cloud,
    wherein the one or more images of the object include one or more epipolar views, and
    wherein the generating the 3D model represented by the point cloud for the object comprises:
        selecting a point on a first view of the one or more epipolar views;
        projecting a vector from the selected point into a model space;
        projecting the vector onto at least one view of the one or more epipolar views which is not the first view; and
        determining candidate points on the vector for the point cloud.

8. The non-transitory computer-readable medium of claim 7, wherein the selected point is on a periphery of the object.

9. The non-transitory computer-readable medium of claim 7, wherein the model space is enclosed by the one or more epipolar views.

10. The non-transitory computer-readable medium of claim 7, wherein the selected point is based on a determined bias.

11. The non-transitory computer-readable medium of claim 10, wherein the determined bias includes surface color, surface texture, or specified local region.

12. The non-transitory computer-readable medium of claim 7, wherein each of the one or more other feature vectors is associated with a document.

* * * * *